US012353705B2

(12) United States Patent
Kaku et al.

(10) Patent No.: US 12,353,705 B2
(45) Date of Patent: Jul. 8, 2025

(54) TERMINAL APPARATUS

(71) Applicant: TOYOTA JIDOSHA KABUSHIKI KAISHA, Aichi-ken (JP)

(72) Inventors: Wataru Kaku, Musashino (JP); Yuki Kidokoro, Tokyo-to (JP); Takahiro Kataoka, Yokohama (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 18/675,153

(22) Filed: May 28, 2024

(65) Prior Publication Data
US 2024/0402905 A1 Dec. 5, 2024

(30) Foreign Application Priority Data
Jun. 5, 2023 (JP) ................. 2023-092691

(51) Int. Cl.
*G06F 3/14* (2006.01)
*G06F 3/041* (2006.01)
*G06F 3/04842* (2022.01)
*G06F 3/04845* (2022.01)
*G06F 3/04883* (2022.01)

(52) U.S. Cl.
CPC ...... *G06F 3/04883* (2013.01); *G06F 3/04162* (2019.05); *G06F 3/04842* (2013.01); *G06F 3/04845* (2013.01); *G06F 2203/04808* (2013.01)

(58) Field of Classification Search
CPC ............. G06F 3/04883; G06F 3/04162; G06F 3/04842; G06F 3/04845; G06F 2203/04808; G06F 2203/04806; G06F 3/0425; G06F 3/1454; G09G 2340/12; G09G 5/14
See application file for complete search history.

(56) References Cited

U.S. PATENT DOCUMENTS

| 2004/0017394 A1* | 1/2004 | Adachi | G09G 5/14 715/744 |
| 2013/0055109 A1* | 2/2013 | Takamura | H04N 21/41415 715/753 |
| 2015/0002435 A1* | 1/2015 | Shimizu | G06F 3/0416 345/173 |
| 2022/0300151 A1* | 9/2022 | Oyama | G06F 3/1454 |
| 2023/0325070 A1* | 10/2023 | Kim | G06F 3/04883 |

FOREIGN PATENT DOCUMENTS

| JP | 2004-109402 A | 4/2004 |
| JP | 2012-027324 A | 2/2012 |

* cited by examiner

*Primary Examiner* — Antonio Xavier
(74) *Attorney, Agent, or Firm* — HAUPTMAN HAM, LLP

(57) ABSTRACT

A terminal apparatus includes a communication interface, and a controller configured to communicate using the communication interface, and the controller is configured to receive information to display toward a user a first image drawn in a first drawing area by another user who uses another terminal apparatus, from the another terminal apparatus, and transmit information to superimpose on and display in the first drawing area a second image drawn in a second drawing area by the user, to the another terminal apparatus, the second drawing area being superimposed on the first image displayed.

8 Claims, 4 Drawing Sheets

TERMINAL APPARATUS

CROSS-REFERENCE TO RELATED APPLICATION

This application claims priority to Japanese Patent Application No. 2023-092691, filed on Jun. 5, 2023, the entire contents of which are incorporated herein by reference.

TECHNICAL FIELD

The present disclosure relates to a terminal apparatus.

BACKGROUND

Technology exists for computers at multiple locations to communicate with each other via a network, allowing the users of the computers to make voice calls to each other and exchange information, such as images drawn on a touch panel. Patent Literature (PTL) 1 discloses technology related to inputting/outputting images.

CITATION LIST

Patent Literature

PTL 1: JP 2004-109402 A

SUMMARY

It is inconvenient to users if the input or output environment for images and the like on each computer is different, thereby interfering with the input/output of the images.

It would be helpful to disclose a terminal apparatus and the like that can adjust for environmental differences and contribute to user convenience.

A terminal apparatus in the present disclosure is a terminal apparatus including:
  a communication interface; and
  a controller configured to communicate using the communication interface,
  wherein the controller is configured to:
    receive information to display toward a user a first image drawn in a first drawing area by another user who uses another terminal apparatus, from the another terminal apparatus; and
    transmit information to superimpose on and display in the first drawing area a second image drawn in a second drawing area by the user, to the another terminal apparatus, the second drawing area being superimposed on the first image displayed.

According to the terminal apparatus and the like in the present disclosure, environmental differences between terminal apparatuses can be adjusted, thereby contributing to user convenience.

BRIEF DESCRIPTION OF THE DRAWINGS

In the accompanying drawings.

DETAILED DESCRIPTION

Embodiments are described below.

Figure 1:
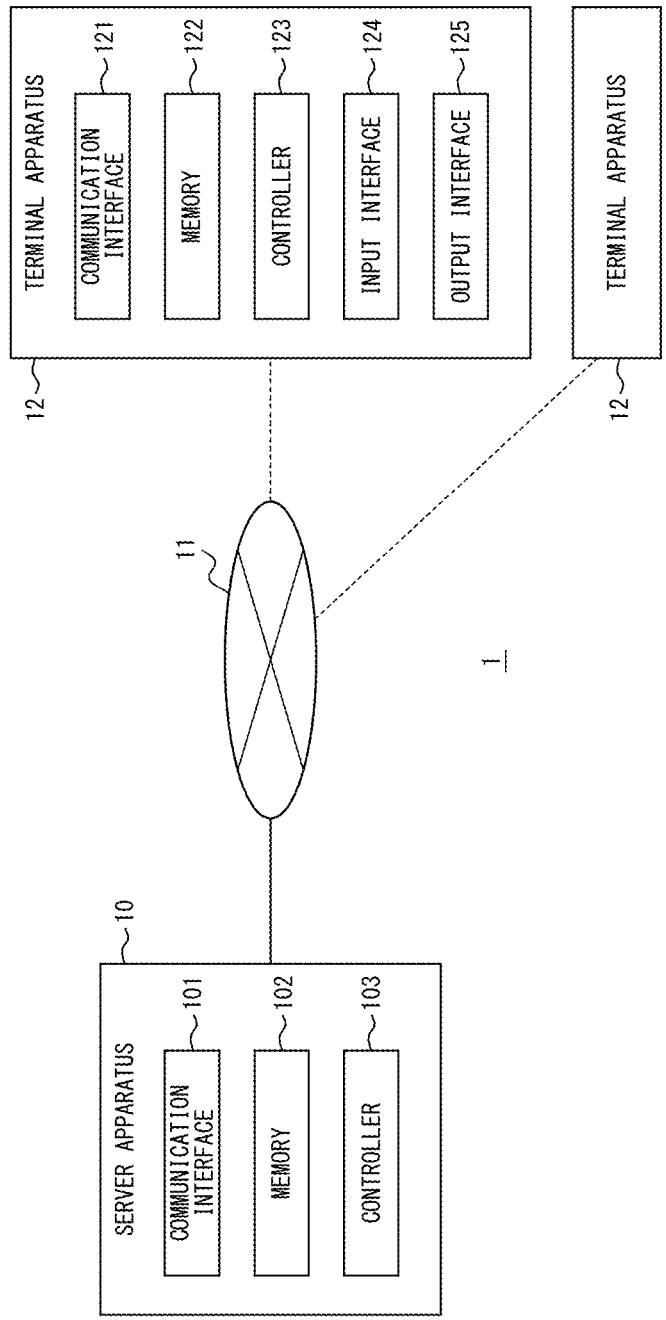
FIG. 1 is a diagram illustrating an example configuration of a communication system.
Figure 2:
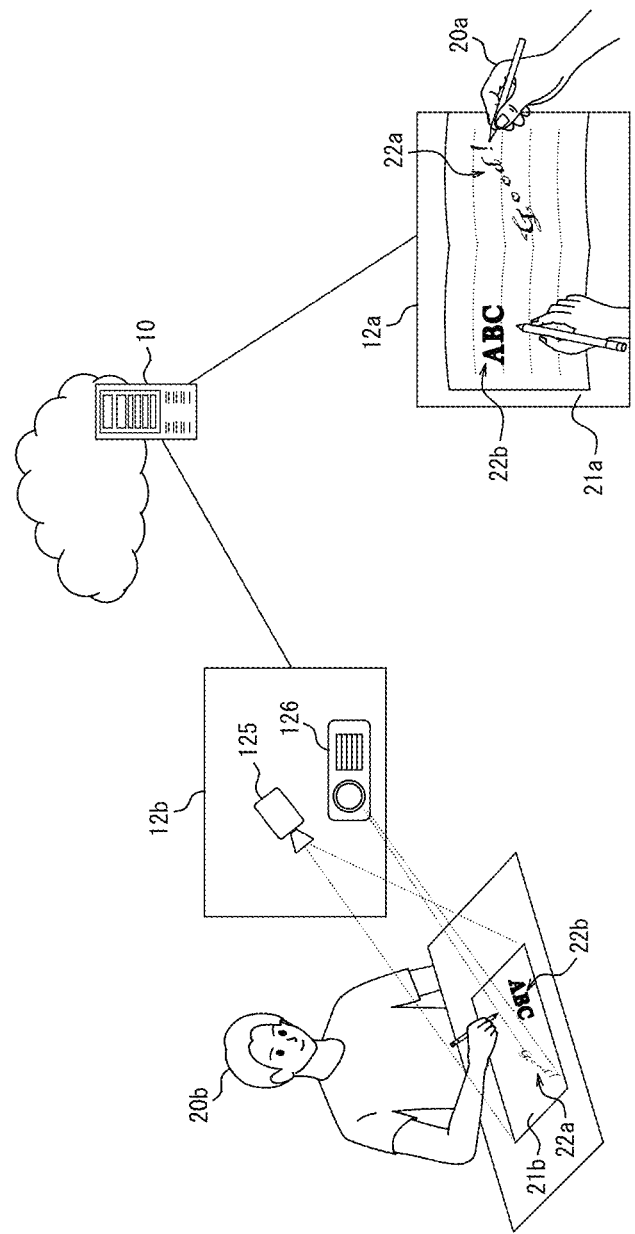
FIG. 2 is a diagram illustrating use of terminal apparatuses.

First, the configuration of the system including the terminal apparatus and the use of the terminal apparatuses in the present embodiment are explained using FIGS. 1 and 2.

FIG. 1 is a diagram illustrating an example configuration of a communication system 1 in the present embodiment. The communication system 1 includes at least one server apparatus 10 and a plurality of terminal apparatuses 12 that are connected via a network 11 to enable communication of information with each other. The communication system 1 is a system for enabling a plurality of users to call each other and exchange images using their respective terminal apparatuses 12.

The server apparatus 10 is, for example, a server computer that belongs to a cloud computing system or other computing system and functions as a server that implements various functions. The server apparatus 10 may be configured by two or more server computers that are communicably connected to each other and operate in cooperation. The server apparatus 10 executes relay processing for calls and images. The server apparatus 10 includes a communication interface 101, a memory 102, and a controller 103. These configurations are appropriately arranged on two or more computers in a case in which the server apparatus 10 is configured by two or more server computers.

A terminal apparatus 12 is an information processing apparatus provided with communication functions and audio and video input/output functions and is used by each user. The terminal apparatus 12 is, for example, an information processing terminal, such as a smartphone or a tablet terminal, or an information processing apparatus, such as a personal computer. The terminal apparatus 12 includes a communication interface 121, a memory 122, a controller 123, an input interface 125, and an output interface 126.

The network 11 may, for example, be the Internet or may include an ad hoc network, a local area network (LAN), a metropolitan area network (MAN), other networks, or any combination thereof.

In FIG. 2, the use of the terminal apparatuses 12 are illustrated. In FIG. 2, a mode in which the user 20 exchanges, with another user (referred to as users 20a and 20b, respectively), a drawn image 22 (referred to as drawn images 22a and 22b, respectively, when distinguished for the users 20a and 20b) drawn in a drawing area 21 (referred to as drawing areas 21a and 21b, respectively, when distinguished for the users 20a and 20b) using each of the terminal apparatuses 12 (referred to as terminal apparatuses 12a and 12b, respectively, when differentiated in correspondence to the users 20a and 20b) is schematically illustrated. Here, the drawing area 21 is an area of any size for the user 20 to draw, and includes the paper surface, the touch panel, etc. The image to be drawn (hereinafter referred to as "drawn image") 22 can be any character, symbol, painting, etc. drawn with a pen, a stylus pen, a fingertip, etc. Furthermore, the drawn image 22 is acquired by the terminal apparatus 12 by being captured by a camera included in the input interface 125 or by a touch panel included in the input interface 125. The other party's drawn image 22 is then superimposed on and displayed in the drawing area 21 by a display included in the output interface 126 and superimposed on the touch panel, or by the projection of a projector included in the output interface 126.

The terminal apparatus 12*a* in the present embodiment receives information to display toward the user 20*a* the drawn image 22*b* drawn in the drawing area 21*b* by another user 20*b* who uses another terminal apparatus 12*b*, from the terminal apparatus 12*b*, and transmit information to superimpose on and display in the drawing area 21*b* the drawn image 22*a* drawn in the drawing area 21*a* by the user 20*a*, to another terminal apparatus 12*b*, the drawing area 21*a* being superimposed on the drawn image 22*b* displayed. In this way, the users 20 of the terminal apparatus 12 can exchange additional drawn images 22 with each other while viewing the other party's drawn image 22 in the drawing area 21. In this case, as described below, the other party's drawn image 22 is enlarged and reduced as appropriate and displayed in the drawing area 21. Environmental differences of each terminal 12 apparatus in inputting/outputting images can thus be adjusted, thereby contributing to the convenience of the user 20.

Next, the configuration of the server apparatus 10 is described in detail.

The communication interface 101 includes one or more interfaces for communication. The interface for communication is, for example, a LAN interface. The communication interface 101 receives information to be used for the operations of the server apparatus 10 and transmits information obtained by the operations of the server apparatus 10. The server apparatus 10 is connected to the network 11 by the communication interface 101 and communicates information with the terminal apparatuses 12 via the network 11.

The memory 102 includes, for example, one or more semiconductor memories, one or more magnetic memories, one or more optical memories, or a combination of at least two of these types, to function as main memory, auxiliary memory, or cache memory. The semiconductor memory is, for example, Random Access Memory (RAM) or Read Only Memory (ROM). The RAM is, for example, Static RAM (SRAM) or Dynamic RAM (DRAM). The ROM is, for example, Electrically Erasable Programmable ROM (EEPROM). The memory 102 stores information to be used for the operations of the server apparatus 10 and information obtained by the operations of the server apparatus 10.

The controller 103 includes one or more processors, one or more dedicated circuits, or a combination thereof. The processor is a general purpose processor, such as a central processing unit (CPU), or a dedicated processor, such as a graphics processing unit (GPU), specialized for a particular process. The dedicated circuit is, for example, a field-programmable gate array (FPGA), an application specific integrated circuit (ASIC), or the like. The controller 103 executes information processing related to operations of the server apparatus 10 while controlling components of the server apparatus 10.

The functions of the server apparatus 10 are realized by a processor included in the controller 103 executing a control program. The control program is a program for causing a computer to function as the server apparatus 10. Some or all of the functions of the server apparatus 10 may be realized by a dedicated circuit included in the controller 103. The control program may be stored on a non-transitory recording/storage medium readable by the server apparatus 10 and be read from the medium by the server apparatus 10.

Next, the configuration of the terminal apparatus 12 is described in detail.

The communication interface 121 includes a communication module compliant with a wired or wireless LAN standard, a module compliant with a mobile communication standard such as LTE, 4G, or 5G, or the like. The terminal apparatus 12 connects to the network 11 via a nearby router apparatus or mobile communication base station using the communication interface 121 and communicates information with the server apparatus 10 and the like over the network 11.

The memory 122 includes, for example, one or more semiconductor memories, one or more magnetic memories, one or more optical memories, or a combination of at least two of these types. The semiconductor memory is, for example, RAM or ROM. The RAM is, for example, SRAM or DRAM. The ROM is, for example, EEPROM. The memory 122 functions as, for example, a main memory, an auxiliary memory, or a cache memory. The memory 122 stores information to be used for the operations of the controller 123 and information obtained by the operations of the controller 123.

The controller 123 has one or more general purpose processors, such as CPUs or Micro Processing Units (MPUs), or one or more dedicated processors, such as GPUs, that are dedicated to specific processing. Alternatively, the controller 123 may have one or more dedicated circuits such as FPGAs or ASICs. The controller 123 is configured to perform overall control of the operations of the terminal apparatus 12 by operating according to the control/processing programs or operating according to operating procedures implemented in the form of circuits. The controller 123 then transmits and receives various types of information to and from the server apparatus 10 and the like via the communication interface 121 and executes the operations according to the present embodiment.

The input interface 125 includes one or more interfaces for input. The interface for input may include, for example, a physical key, a capacitive key, a pointing device, and/or a touch panel integrally provided with a display. The interface for input also includes one or more cameras that captures images. The camera may be configured as a separate unit from the terminal apparatus 12 and may be configured to communicably communicate with the terminal apparatus 12 directly or via the network 11. The camera is installed at a position and an angle that allows the user 20 to capture an image of the drawing area 21 when the user 20 draws at hand. The camera may be installed to be able to capture the image of an area that includes, for example, the face of the user 20 who draws. Furthermore, the interface for input may include a microphone that accepts audio input. The input interface 125 accepts operations for inputting information to be used in the operations of the controller 123, captures the image, collects sound, etc., and transmits the inputted information, the captured image, information on the sound, and the like to the controller 123.

The output interface 126 includes one or more interfaces for output. The interface for output may include, for example, a display, a projector, and a speaker. The display is, for example, an LCD or an organic EL display. The display may be configured as a touch panel, integrated with the input interface of the input interface 125. The projector may be configured to communicate with the terminal apparatus 12 directly or via the network 11. The output interface 126 outputs information obtained by the operations of the controller 123.

The functions of the controller 123 are realized by a processor included in the controller 123 executing a control program. The control program is a program for causing the processor to function as the controller 123. Some or all of the functions of the controller 123 may be realized by a dedicated circuit included in the controller 123. The control program may be stored on a non-transitory recording/storage medium readable by the terminal apparatus 12 and be read from the medium by the terminal apparatus 12.

In the present embodiment, the controller 123 uses the input interface 125 to collect the speech sound of the user 20 and accepts the drawn image 22 while capturing the image of the area including the face of the user 20 and the drawing area 21. The controller 123 also generates encoded information by encoding the output image and audio information for playing back the user's speech. The image for output has an arbitrary, e.g., so-called 4K (3840×2160) or higher pixel count. The controller 123 may perform any appropriate processing (such as resolution change and trimming) on the output image at the time of encoding. The controller 123 uses the communication interface 121 to transmit the encoded information to another terminal apparatus 12 via the server apparatus 10.

The controller 123 also receives the encoded information, transmitted from another terminal apparatus 12 via the server apparatus 10, using the communication interface 121. Upon decoding the encoded information, the controller 123 uses the decoded information to output the output image using the display or the projector of the output interface 126 or output the sound using the speaker. The display or the projector for displaying the other party's drawn image 22 has an output resolution of any, e.g., so-called 4K or higher. The image of the other user 20 may be represented in 2D or by a 3D model. The display for displaying the 3D model of the other user 20 may be, for example, a light field display that makes the 3D image visible.

Figure 3:
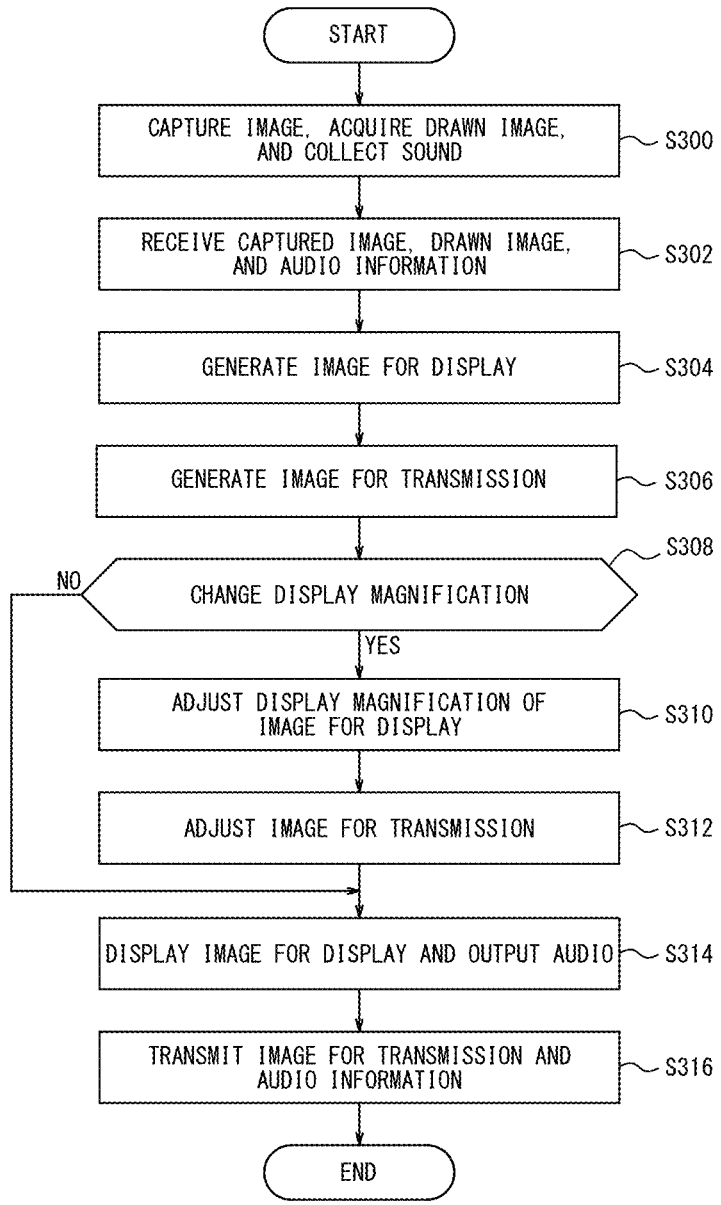
FIG. 3 is a flowchart illustrating an example of operations of a terminal apparatus.

FIG. 3 is a flowchart illustrating operation procedures of the terminal apparatus 12. The following example shows the operation of the terminal apparatus 12a when it exchanges information with the terminal apparatus 12b. The procedures in FIG. 3 are, for example, performed by the controller 123 of the terminal apparatus 12a in freely determined cycles of several milliseconds to several tens of milliseconds.

In step S300, the controller 123 captures an image of the area including the face of the user 20a, acquires the drawn image 22a by capturing the image or the touch input, and collects the speech sound. The controller 123 acquires the captured image of the user 20a, the drawn image 22a, and audio information from the input interface 125.

In step S302, the controller 123 receives from the terminal apparatus 12b the captured image of the user 20b, the drawn image 22b, and the audio information. The terminal apparatus 12a receives from the terminal apparatus 12b the captured image 40 including the drawn image 22b drawn in the drawing area 21b, for example, as illustrated in example 401 in FIG. 4.

In step S304, the controller 123 generates an image for display. The image for display is an image superimposed on and displayed in the drawing area 21a and includes the drawn image 22b. For example, as illustrated in example 402 in FIG. 4, an image for display 41 to superimpose on and display in the drawing area 21a is generated. The image for display 41 includes the drawn image 22b.

In step S306, the controller 123 generates an image for transmission. The image for transmission is an image superimposed on and displayed in the drawing area 21b and includes the drawn image 22a when the drawing is done in the drawing area 21a.

In step S308, the controller 123 determines whether the display magnification of the image for display has been changed. The display magnification is changed by tapping, swiping, etc. on the touch panel, or by specifying the magnification with a pointing device or keys, etc., performed by the user 20a on the input interface 125 of the terminal apparatus 12a. If the display magnification is changed in response to such an operation (Yes), the controller 123 proceeds to steps S310 and S312. On the other hand, if the display magnification is not changed (No), the controller 123 skips steps S310 and S312 and proceeds to step S314.

In step S310, the controller 123 adjusts the display magnification of the image for display. The controller 123 adjusts the display magnification of the image for display according to the changed display magnification. When the display magnification is changed from 1 time to m times (m is a positive real number other than 1), the controller 123 adjusts the image for display by multiplying the area of the image for display that includes at least part of the drawn image 22b transmitted from the terminal apparatus 12b by m times. For example, as illustrated in example 403 in FIG. 4, the image for display 41 to superimpose on and display in the drawing area 21a is adjusted and the drawn image 22b is enlarged.

Figure 4:
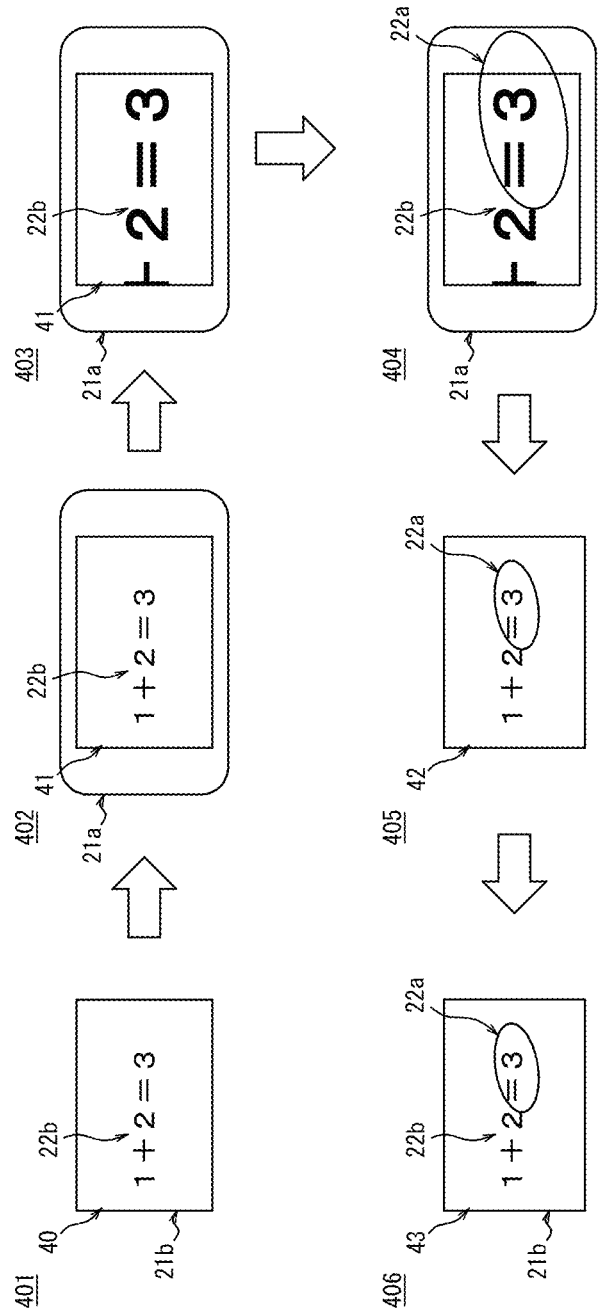
FIG. 4 is a diagram illustrating display magnification changes in an image for display and an image for transmission.

In step S312, the controller 123 adjusts the display magnification of the image for transmission. The controller 123 adjusts the display magnification of the image for transmission by multiplying the drawn image 22a drawn by the user 20a at the terminal apparatus 12a by (1/m) times according to the changed m times display magnification. For example, example 404 in FIG. 4 illustrates a drawn image 22a against an enlarged drawn image 22b in drawing area 21a. In this case, since the drawn image 22b is enlarged, the image for transmission 42 is adjusted and the drawn image 22a is reduced, as illustrated in example 405. The image for transmission 42 is generated in step S306 and adjusted in step S312.

In step S314, the controller 123 displays an image for display and outputs audio. The display of the image for display includes the display of the captured image of the user 20b and the display of the drawn image 22b in the drawing area 21a. For example, the image for display 41 illustrated in example 403 in FIG. 4 is displayed.

In step S316, the controller 123 transmits the image for transmission and audio information. The controller 123 encodes the image for transmission and the audio information and transmits the encoded information toward the terminal apparatus 12b.

The procedure in FIG. 3 is executed in the same way for the terminal apparatus 12b. By executing step S314 on the terminal apparatus 12b, the image for display 43 is superimposed on and displayed in the drawing area 21b, as illustrated in example 406 in FIG. 4. Here, the drawn image 22a added by the terminal apparatus 12a to the initially drawn image 22b is included in the image for display 41.

Thus, the terminal apparatuses 12a and 12b perform the procedures in FIG. 3, respectively, to exchange the drawn image 22 and to make a call. Thus, it is possible for the users 20 of the terminal apparatus 12 to exchange additional drawn images 22 while viewing the other party's drawn image 22 in the drawing area 21. In this case, the other party's drawn image 22 is enlarged and reduced accordingly and displayed, which improves the visibility of the other party's drawn image 22 and facilitates additional drawing. Environmental differences of each terminal apparatus 12 in inputting/outputting images can thus be adjusted, thereby contributing to the convenience of the user 20.

In the example, the terminal apparatus 12 is configured to store the drawn image 22 of the other party to be displayed or the drawn image 22 to be additionally drawn in the memory 122, and to be able to display it at any time in response to the operation of the user 20. When the terminal apparatus 12a, together with the terminal apparatus 12b, communicates with the terminal apparatus 12c used by yet another user 20c, the terminal apparatus 12a may be configured to be able to switch the image displayed in response to the operation of the user 20a between the drawn image 22b and the drawn image 22c at any time. Furthermore, the terminal apparatus 12a may be able to set the display time of each of the drawn images 22b and 22c in response to the operation of the user 20a.

While embodiments have been described with reference to the drawings and examples, it should be noted that various modifications and revisions may be implemented by those skilled in the art based on the present disclosure. Accordingly, such modifications and revisions are included within the scope of the present disclosure. For example, functions or the like included in each means, each step, or the like can be rearranged without logical inconsistency, and a plurality of means, steps, or the like can be combined into one or divided.

The invention claimed is:

1. A terminal apparatus comprising:
 a communication interface; and
 a controller configured to communicate using the communication interface,
 wherein the controller is configured to:
  receive information to display toward a user of the terminal apparatus a first image drawn in a first drawing area by another user who uses another terminal apparatus, from the another terminal apparatus; and
  transmit information to superimpose on and display in the first drawing area a second image drawn in a second drawing area by the user of the terminal apparatus, to the another terminal apparatus, the second drawing area being superimposed on the first image displayed; and
 wherein in response to the first image being enlarged and superimposed on and displayed in the second drawing area, the second image is drawn in an enlarged size same as the enlarged first image in the second drawing area, and the second image in the enlarged size is then reduced and superimposed on and displayed in the first drawing area.

2. The terminal apparatus according to claim 1, wherein in response to the first image being reduced and superimposed on and displayed in the second drawing area, the second image is drawn in a reduced size same as the reduced first image in the second drawing area, and the second image in the reduced size is then enlarged and superimposed on and displayed in the first drawing area.

3. The terminal apparatus according to claim 1, wherein the controller is capable of switching between displaying and not displaying the first image.

4. The terminal apparatus according to claim 3, wherein the controller is further configured to:
 receive information to display toward the user of the terminal apparatus a third image drawn in a third drawing area by yet another user who uses yet another terminal apparatus, from the yet another terminal apparatus; and
 transmit information to superimpose on and display in the third drawing area a fourth image drawn in a fourth drawing area by the user of the terminal apparatus, to the yet another terminal apparatus, the fourth drawing area being superimposed on the third image displayed when the first image is not displayed.

5. The terminal apparatus according to claim 1, wherein the controller is further configured to:
 in response to determining a display magnification of an image for display has been changed, adjust the display magnification of the image for display based on a changed display magnification, and
 in response to the display magnification of the image for display being adjusted, adjust a display magnification of an image for transmission.

6. The terminal apparatus according to claim 5, wherein in response to the display magnification being changed from 1 time to m times, wherein m is a positive real number other than 1, the controller is further configured to adjust the image for display by multiplying an area of the image for display that includes at least a part of the image for display by m times.

7. The terminal apparatus according to claim 6, wherein the controller is further configured to adjust the display magnification of the image for transmission by multiplying the image for transmission by (1/m) times.

8. The terminal apparatus according to claim 1, wherein the controller is further configured to:
 receive information to display toward the user of the terminal apparatus a third image drawn in a third drawing area by yet another user who uses yet another terminal apparatus, from the yet another terminal apparatus;
 set, in response to an operation of the user, a first display time of the first image and a second display time of the third image; and
 display the first image and the third image respectively for the first display time and the second display time.

* * * * *